United States Patent [19]

King

[11] Patent Number: 4,551,217
[45] Date of Patent: Nov. 5, 1985

[54] LIQUID TREATER HAVING HINGE-ACTION CLEANING BRUSHES

[76] Inventor: Arthur S. King, 8021 Cherokee, Leawood, Kans. 66206

[21] Appl. No.: 644,390

[22] Filed: Aug. 27, 1984

[51] Int. Cl.$^4$ .............................................. B05C 5/02
[52] U.S. Cl. .................................... 204/212; 204/304
[58] Field of Search ............... 204/212, 217, 302, 304, 204/DIG. 10

[56] References Cited

U.S. PATENT DOCUMENTS

| | | | |
|---|---|---|---|
| 1,473,060 | 11/1923 | Taylor | 204/DIG. 10 |
| 2,530,524 | 11/1950 | Hlavin | 204/217 |
| 3,806,441 | 4/1974 | Rowe | 204/DIG. 10 |
| 4,201,651 | 5/1980 | Themy | 204/217 |
| 4,236,990 | 12/1980 | King | 204/275 |
| 4,242,190 | 12/1980 | King | 204/212 |
| 4,292,163 | 9/1981 | King | 204/304 |
| 4,444,637 | 4/1984 | King | 204/212 |

*Primary Examiner*—T. M. Tufariello
*Attorney, Agent, or Firm*—Schmidt, Johnson, Hovey & Williams

[57] ABSTRACT

An electric treater for promoting flocculation of suspended solids in a liquid is provided with special scrubbing brushes that bear against electrodes of the treater tending to accumulate a layer of adhering ionic particles so as to dislodge and remove the particles from the electrodes in order to promote optimum electrodic action. In one form of the invention the electrodes are disposed concentrically one within the other, and as the inner electrode rotates, a hinge-action brush associated with the stationary electrode bears against and cleans the rotary electrode while a similar hinge-action brush associated with the rotary electrode bears against and cleans the stationary electrode. Interengaging cam components flip the brush on the rotary electrode momentarily out of the path of travel of the stationary brush during each rotation to avoid interengagement of the brushes. In another form of the invention, hinge-action brushes on rotary supports sweep into engagement with oppositely rotating electrodes and snap through a quick-flip self-cleaning action under the influence of a strong return spring after sweeping out of engagement with the electrode. The rotary supports may be intermittently started and stopped to index the brushes at 90° intervals, whereby to hold the brushes in scrubbing positions or in mutually opposed relationships with one another such that by electrifying the metal bristles of the scrubbers, an electric, treating field may be established therebetween for auxiliary treating action.

12 Claims, 6 Drawing Figures

LIQUID TREATER HAVING HINGE-ACTION CLEANING BRUSHES

TECHNICAL FIELD

This invention relates to the field of treating industrial waste waters and the like through electrodic action in order to encourage flocculation and precipitation of ionic particles therein and, more particularly, to a means for maintaining the co-acting electrode surfaces in such a system relatively free of collected particles which tend to inhibit effective electrodic action.

BACKGROUND

A number of prior arrangements for maintaining the electrodes of a liquid treater as clean as possible during operation are disclosed in my earlier U.S. Pat. Nos. 4,236,990; 4,242,190; 4,292,163; and 4,444,637.

The present invention is directed to an alternative and in many respects improved means of maintaining proper electrodic action through effective electrode cleaning.

SUMMARY OF THE PRESENT INVENTION

In this respect, the present invention contemplates hinge-action scrubbing brushes that are yieldably biased into cleaning engagement with the electrode surface to be cleaned so that, when either the electrode or the brush, or both are rotated, the relative movement therebetween effects an efficient scrubbing and cleaning action to dislodge adhering particles from the electrode. The hinging action is particularly beneficial in one form of the invention in which the two electrodes of the apparatus are concentrically disposed one within the other and two sets of scrubbing brushes are utilized, one mounted on the stationary electrode of the pair for cleaning the inner, rotary electrode and the other mounted on the rotary electrode itself for cleaning the stationary electrode during such rotation. A cam arrangement momentarily retracts one of the brushes out of the path of travel of the other during each revolution to avoid having the two brushes strike one another.

A second form of the invention utilizes hinging brushes that are carried on rotary supports, and instead of constantly bearing against the electrode surface, are intermittently rotated into and out of contact with the latter. After being held in the electrode-contacting position for a predetermined period of time, the brushes may be rotated out of such contact, and once so moved, a spring mechanism associated with the brush causes the latter to snap through a quick-flipping action to its normal, unstressed condition, the quick-flipping action and consequent abrupt movement through the liquid having the effect of selfcleaning the brush. By utilizing additional brushes and rotary supports therefor, adjacent pairs of the brushes and supports may be timed with one another such that opposed brushes on the two supports come into alignment with one another at periodic intervals and may be provided with opposite electric charges so as to establish an auxiliary electric treating field therebetween.

DETAILED DESCRIPTION

Figure 1:
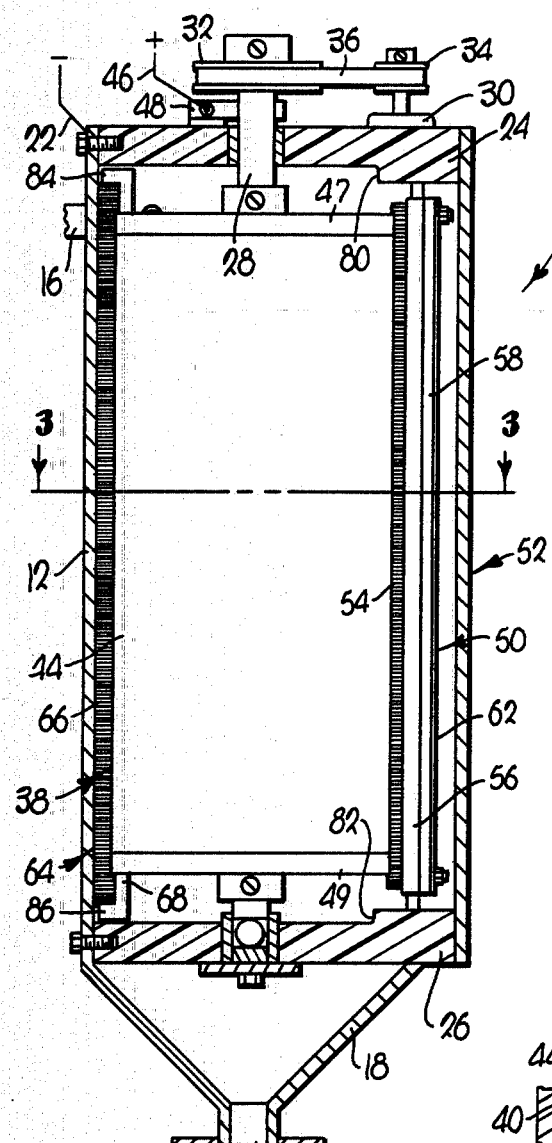
FIG. 1 is a vertical cross-sectional view of a liquid treater constructed in accordance with the principles of the present invention.
Figure 2:
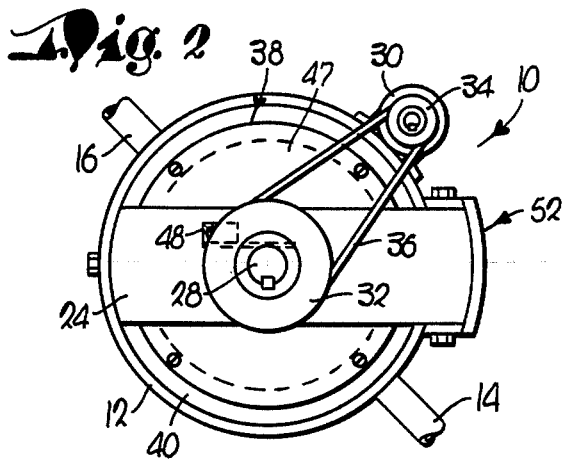
FIG. 2 is a top plan view thereof.
Figure 3:
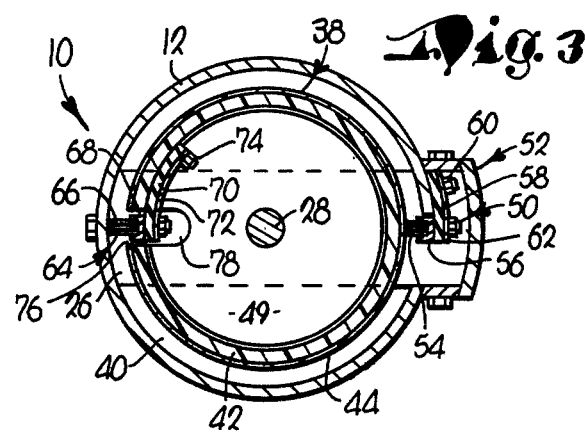
FIG. 3 is a transverse cross-sectional view of the treater taken substantially along line 3—3 of FIG. 1.

The treater 10 includes a conductive, cylindrical housing 12 provided with a liquid inlet 14 adjacent its lower end and a liquid outlet 16 adjacent its upper end. The bottom of the housing 12 is formed in the nature of a hopper 18 or collecting basin for receiving materials which have precipitated out of the liquid being processed in the treater 10, the hopper 18 having a discharge drain 20 which may advantageously be controlled and regulated by a drain valve (not shown). The housing 12 is connected to one side of a source of electrical potential by a lead 22 at its upper ends.

A pair of vertically-spaced, dielectric, generally rectangular supports 24 and 26 span the housing 12 at the opposite upper and lower ends thereof respectively and rotatively support a vertical shaft 28 driven by a motor 30, sheaves 32, 34, and belt 36. The shaft 28 in turn supports a cylindrical inner electrode broadly denoted by the numeral 38 which is concentric with the housing 12 and is slightly smaller in diameter so that an annular treating region 40 is defined therebetween essentially from top to bottom of the housing 12.

The inner electrode 38 may be of a variety of different configurations. For purposes of illustration, it has been shown as being of generally tubular construction, comprising in this respect a tube 42 of dielectric material covered by a conductive, outer skin 44. Opposite ends of the tube 42 are closed by caps 46 and 48. Electrification of the skin 44 is provided via a lead 46 from the opposite side of the source of electrical potential provided for the cylinder 12 which is connected to a conductive contact 48 which bears against the conductive shaft 28. Suitable means (not shown) within the interior of the tube 42 provide electrical continuity between the shaft 28 and the skin 44.

A scrubbing brush 50 is attached to the cylinder 12 in disposition for bearing against the skin 44 during rotation of inner electrode 38 in order to clean the latter. The brush 50 is elongated as illustrated perhaps best in FIG. 1 so as to traverse essentially the full length of the electrode 38 and is contained within a sealed side chamber 52 which runs the length of the cylinder 12 along the outside thereof.

Brush 50 includes a strip of metal bristles 54 retained in a holder 56 which is in turn fastened to a hinge 58 that may be advantageously constructed of rubber of a synthetic resinous material. The hinge 58 is fastened via screws 60 or the like to the outer face of the cylinder 12 and is provided with a backup leaf spring 62 of stainless steel or the like which provides a yieldable force biasing the bristles 54 out into the region 40 and into scrubbing contact with the skin 44 of electrode 38. The rubber hinge 58 also provides, through its inherent resiliency, a degree of biasing force along with its hinging ability.

A second scrubbing brush 64 is mounted on the inner electrode 38 for rotation with the latter and is essentially identical in construction to the brush 50, having preferably metal bristles 66, a holder 68 therefor, a flap hinge 70 of rubber or sythentic resinous material, and a stainless steel leaf spring 72. The brush 64 is attached to the inside of the tube 42 via screws 74 and is urged by the leaf spring 72, and also the inherent resiliency of the rubber hinge 70, radially outwardly through a vertical clearance slot 76 in the tube 42 for contacting engagement with the inner surface of the cylinder 12. Clearance notches such as the notch 78 in the lower cap 48 are aligned with the slot 76 and permit hinging movement of the bristles 66 into and out of the interior of the tube 42.

Figure 4:
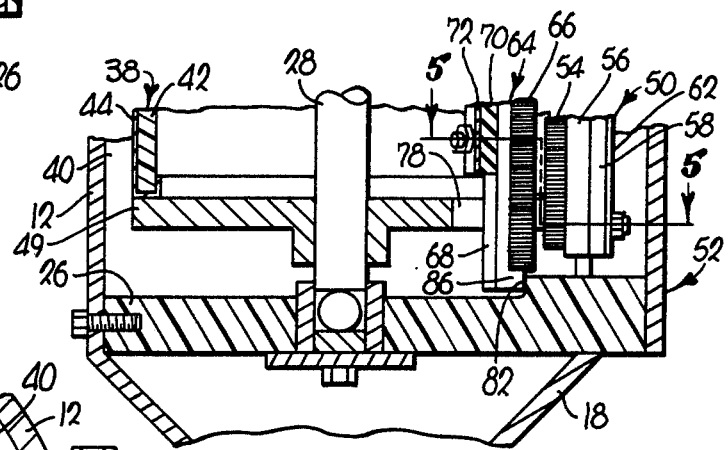
FIG. 4 is an enlarged, fragmentary vertical cross-sectional view of the treater adjacent the lower end thereof illustrating details of construction.
Figure 5:
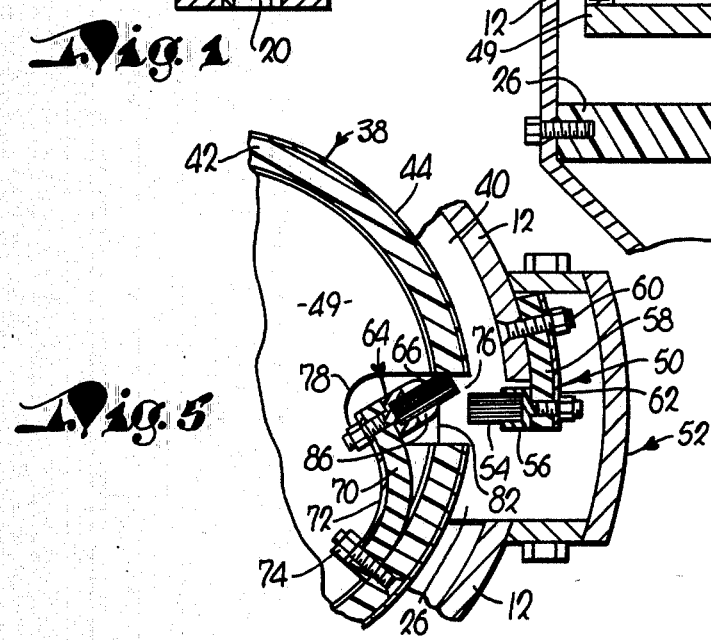
FIG. 5 is a fragmentary transverse cross-sectional view of the treater taken substantially along line 5—5 of FIG. 4.

As illustrated perhaps best in FIGS. 1, 4, and 5, the supports 24 and 26 are provided with radially inwardly facing cam shoulders 80 and 82 which are located above and below the inner electrode 38 respectively yet which project radially inwardly a short distance beyond the outer periphery of the electrode 38. Such cam shoulders 80, 82 are disposed within the path of travel of corresponding, radially outwardly projecting cam surfaces 84 and 86 at the upper and lower ends of the brush holder 68 on inner electrode 38 in disposition for engaging the cam shoulders 80 and 82 for a short distance during each rotation of inner electrode 38. As illustrated perhaps best in FIG. 5, cam shoulders 80, 82 are located in the area of the brush 50 and are of such duration as to cause sufficient inward flexure of the brush 64 to cause bristles 66 thereof to move into a clearing relationship with the bristles 54 of brush 50, thereby avoiding impacting engagement between the two brushes 50, 64 during rotation of the inner electrode 38.

Figure 6:
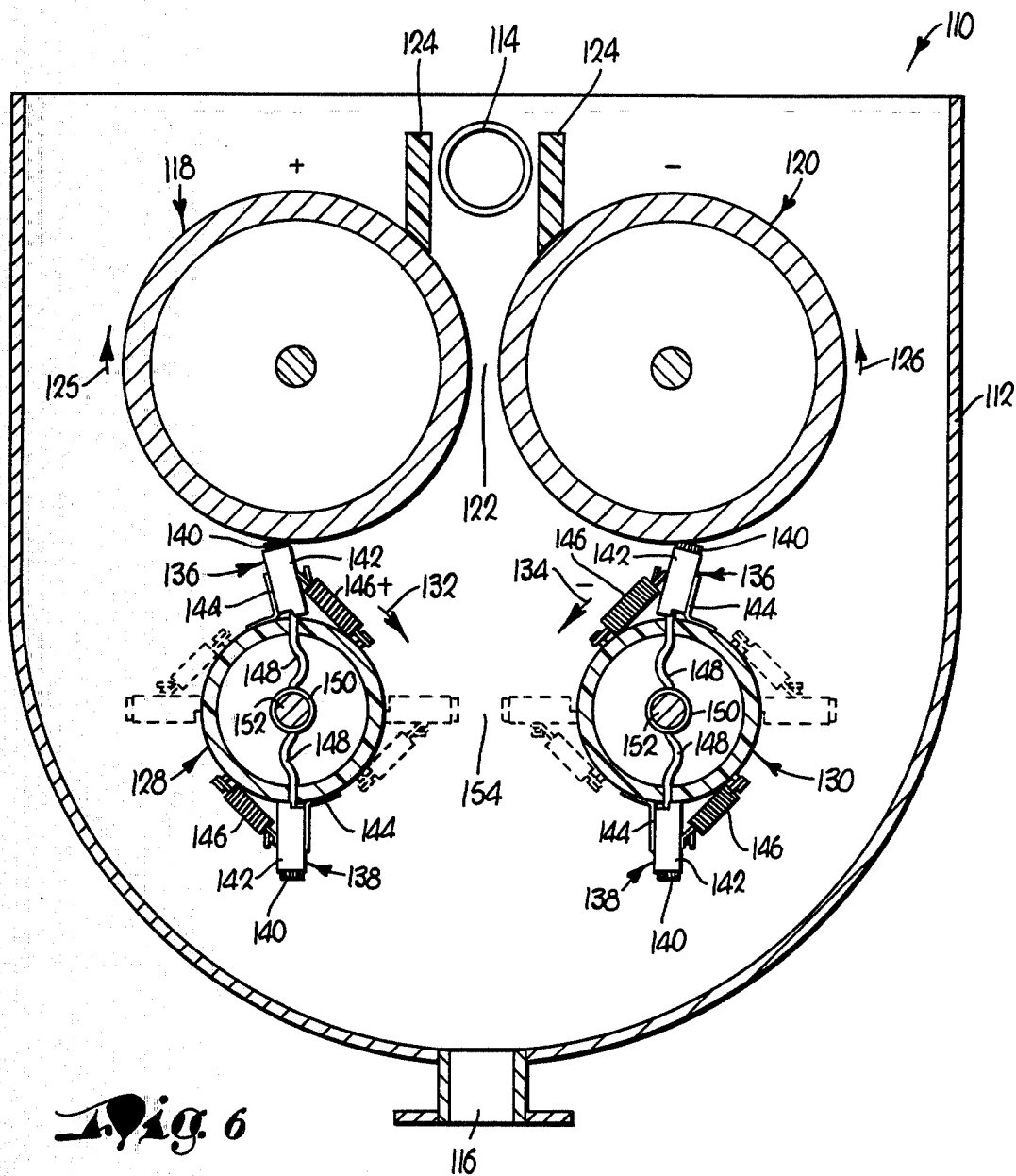
FIG. 6 is a vertical cross-sectional view through a second treater constructed in accordance with the principles of the present invention.

FIG. 6 shows a second form of the invention used in connection with a different style treater. In this respect, the treater 110 of FIG. 6 includes a generally U-shaped trough 112 which is closed at its opposite ends and open at the top. An inlet 114 directs liquid to be treated into the trough 112, and an outlet (not shown) directs treated liquid away from the latter. A drain 116 in the bottom of the trough 112 may be used to draw off precipitation particles and may be opened and closed by a suitable control valve (not shown).

Within the trough 112 is disposed a pair of rotary electrodes 118 and 120 which are connectable to opposite sides of a source of electrical potential so as to provide opposite charges thereon and to establish an electrical field existing in the region 122 between the two electrodes 118, 120. If desired, each of the electrodes 118, 120 may be provided with a scraper 124 positioned at its upper periphery as set forth in my U.S. Pat. No. 4,292,163. The electrodes 118 and 120 are oppositely rotated as illustrate by the arrows 124 and 126.

Disposed in that area of the trough 112 below the electrodes 118, 120 is a pair of rotary supports 128 and 130 which are driven in opposite directions as illustrated by the arrows 132, 134. Each of these supports 128, 130 is preferably constructed of a dielectric material and carries two, diametrically opposed scrubbing brushes 136 and 138 thereon of essentially similar construction to the brushes 50 and 64 of the first embodiment. In this respect, each of the brushes 136, 138 includes a set of metal bristles 140 maintained in a dielectric holder 142 which is in turn fastened via a rubber hinge or the like 144 to the periphery of the support 128 or 130. Instead of a leaf spring, one or more tension springs 146 are connected between the holder 142 and the surface of the support 128, 130 to yieldably bias the holder 142 about the hinge 144 into an essentially radially outwardly projecting position. Preferably, the holders 142 cover all but the exposed outermost tips of the bristles 140 and such bristles 140 are connected via suitable leads 148 to a conductive sleeve 150 on the conductive center shaft 152 which is in turn electrically connected with the same side of a source of electrical potential as the corresponding electrode. Thus, as illustrated, the bristles 140 on one of the supports 130 carry the same electrical charge as their corresponding electrode 120, while the bristles 140 associated with the other support 128 carry the opposite electrical charge associated with their electrode 118.

OPERATION

The manner of use and operation of the treater 10 is believed readily apparent from the foregoing detailed description thereof. Suffice it to point out, then, as the inner electrode 38 rotates within the housing 52, ionic particles tending to adhere to the surfaces of the two electrodes are continuously scrubbed therefrom by the brushes 50, 64. As the inner electrode 38 nears the completion of each revolution thereof, the cam surfaces 84, 86 associated with the inner brush 64 come into operating engagement with the cam shoulders 80, 82 so as to flex the hinge 70 and spring 72 radially inwardly on brush 64 and cause the latter to retract within the interior of electrode 38 into clearance relationship with the brush 50. Once electrode 38 has rotated sufficiently on past the brush 50, the cam surfaces 84, 86 likewise move beyond the cam shoulders 80, 82, and the hinge 70 and leaf spring 72 return the bristles 66 radially outwardly into scrubbing engagement with the interior surface of the housing 12.

In the case of the treater 110, the supports 128, 130 may be connected with drive means which not only rotate the same, but which cause them to dwell at 90° intervals for predetermined periods of time. Thus, the brushes 136, 138 on each holder 128, 130 are periodically swept into engagement with their corresponding electrode 118 or 120, maintained in such contact for a predetermined period of time, and then rotated on around into a 90° position as illustrated in phantom lines in FIG. 6. (While only two brushes 136, 138 have been illustrated on each of the supports 128, 130, it is to be understood that four of such brushes could be utilized if desired.)

As one of the brushes 136 or 138 is rotated into contacting engagement with the corresponding electrode 118 or 120, the hinging action of hinges 144 and the tension in springs 146 combine to cause the bristles 140 to be firmly and aggressively engaged with the corresponding electrode surface. Thus, superior cleaning and scrubbing action is assured. Moreover, in the event that the supports 128, 130 are rotated continuously, rather than intermittently, it will be appreciated that the hinging action of the brushes 136, 138 is helpful in maintaining a prolonged scrubbing contact of the latter with the electrode surfaces, as contrasted to that situation existing if the brushes 136, 138 were merely fixedly radially disposed.

In any event, as the brushes 136, 138 sweep into engagement with the proximal electrode surface, they flex in a retrograde manner about the hinges 144 until contact is broken with the electrode surface. Thereupon, the springs 146 sharply snap the bristles 140 and holders 142 through the liquid back into a more truly radial position, and such abrupt action has the effect of dislodging particles from the bristles 144 which might transfer thereto from the electrode surface. Thus, the snap action provides a self-cleaning feature for the brushes 136, 138.

Due to the fact that the tips of the bristles 140 are electrically charged, and further due to the fact that the brushes 136, 138 of the opposite supports 128, 130 are oppositely electrically charged, as the brushes 136, 136 come into opposed alignment with one another, they cooperate to define an auxiliary treating region 154 therebetween through which liquid within the trough 112 can be further exposed to an electric field. This is particularly effective when the supports 128, 130 are held for predetermined periods of time in such rotative position.

I claim:

1. In a liquid treater having electrode means therein for creating an electric field, said electrode means including an elongated electrode, means for cleaning adhering particles from said electrode comprising:
   a support adjacent said electrode;
   a scrubber;
   hinge means swingably mounting said scrubber on the support;
   means for yieldably biasing said scrubber about said hinge means into engagement with the electrode; and
   means for providing relative rotational movement between said electrode and the support for wiping the surface of said electrode with said scrubber during said relative rotation,
   said support comprising a second electrode of said electrode means, each of said electrodes having a scrubber hingedly mounted thereon and yieldably biased into engagement with the opposite electrode.

2. In a liquid treater as claimed in claim 1, wherein said support is stationary and said electrode is rotatable.

3. In a liquid treater as claimed in claim 1, wherein at least one of said scrubbers is provided with actuating means operable to swing the one scrubber momentarily into a clearing position relative to the other scrubber during each relative rotation of the electrodes.

4. In a liquid treater as claimed in claim 3, wherein said second electrode is stationary and the other electrode is rotatable, said actuating means including a first cam surface movable with said rotatable scrubber thereof, and a second cam surface on said stationary electrode in the path of travel of said first cam surface.

5. In a liquid treater as claimed in claim 1, wherein said hinge means comprises a resilient, resinous flap.

6. In a liquid treater as claimed in claim 5, wherein said yieldable biasing means includes a resilient metal leaf spring attached to said flap.

7. In a liquid treater as claimed in claim 1, wherein said scrubber includes a plurality of relatively stiff, metal bristles.

8. In a liquid treater as claimed in claim 1, wherein said second electrode is rotatable so as to rotate said scrubber intermittently into and out of engagement with the other electrode, said means for providing relative rotation being operable to periodically stop said rotation of said second electrode when the scrubber is in engagement with said other electrode.

9. In a liquid treater as claimed in claim 8, wherein said other electrode is rotatable, and in a direction opposite to that of said second electrode.

10. In a liquid treater as claimed in claim 8, wherein said yieldable biasing means is disposed to flip said scrubbers about said hinge means in a self-cleaning snap-action upon rotation of the scrubbers out of engagement with the electrodes.

11. In a liquid treater having electrode means therein for creating an electric field, said electrode means including an elongated electrode, means for cleaning adhering particles from said electrode comprising:
    a support adjacent said electrode;
    a scrubber;
    hinge means swingably mounting said scrubber on the support;
    means for yieldably biasing said scrubber about said hinge means into engagement with the electrode; and
    means for providing relative rotational movement between said electrode and the support for wiping the surface of said electrode with said scrubber during said relative rotation,
    said electrode means including a pair of opposed, oppositely charged electrodes, each provided with its own scrubber, support, hinging means, and yieldable biasing means therefor, said means for providing relative rotational movement being operable to intermittently rotate, stop and hold said supports in alternate positions engaging said scrubbers with the respective electrodes and aligning said scrubbers in spaced opposition to one another, said scrubbers including electrically conductive portions carrying electrical charges of the same polarity as their corresponding electrodes whereby said portions of the scrubbers establish an electric field therebetween when the scrubbers are disposed in said aligned position.

12. In a liquid treater as claimed in claim 11, wherein said portions of the scrubbers comprise metal bristles thereof, said bristles having a layer of dielectric material covering the same, except for exposed, outermost tips thereof.

* * * * *